United States Patent [19]
De La Luz Martinez et al.

[11] Patent Number: 5,589,210
[45] Date of Patent: Dec. 31, 1996

[54] METHOD FOR COOKING WHEAT FLOUR PRODUCTS BY USING INFRARED RADIATION

[75] Inventors: Jose De La Luz Martinez, Puebla; Jesus Gonzalez-Hernandez, Tesoro; Feliciano Sanchez-Sinencio, Tecamachalco; Maximiano Ruiz-Torres, Morelia; Juan De Dios Figueroa C., Tamaulipas; Fernando Martinez-Bustos, Veracruz, all of Mexico

[73] Assignee: Centro de Investigacion Y de Estudios-Avanzados del I.P.N., Mexico City, Mexico

[21] Appl. No.: 519,060

[22] Filed: Aug. 23, 1995

[51] Int. Cl.⁶ ..................................................... A23L 1/00
[52] U.S. Cl. ........................................... 426/243; 426/523
[58] Field of Search ..................................... 426/243, 241, 426/496, 523, 503

[56] References Cited

U.S. PATENT DOCUMENTS 5,223,290  6/1993  Alden ........................................ 426/243

OTHER PUBLICATIONS

Serna–Saldivar, S. O., et al., "Wheat Flour Tortilla Production," *Cereal Foods World*, Oct. 1988, vol. 33, No. 10.

*Primary Examiner*—George Yeung
*Attorney, Agent, or Firm*—Rothwell, Figg, Ernst & Kurz, P.C.

[57] ABSTRACT

Cooking of wheat flour dough tortillas is effected with a considerably reduced cooking time and with the preservation of the characteristics of tortillas obtained by the traditional manual cooking methods, by applying to the uncooked tortillas infrared radiation waves within a wavelength band possessing a maximum absorption factor simultaneously perpendicularly directed on both faces of the tortilla in order to quickly cook both surfaces of the same thus forming outermost capping layers that retain moisture within the body of the tortilla and prevent the dehydration of the same in the cooking cycle.

10 Claims, 2 Drawing Sheets

METHOD FOR COOKING WHEAT FLOUR PRODUCTS BY USING INFRARED RADIATION

FIELD OF THE INVENTION

The present invention refers to the processing of wheat flour products and, more particularly, it is related with a method for cooking wheat flour products, especially wheat flour tortillas, by using infrared radiation.

BACKGROUND OF THE INVENTION

Food products based on wheat flour contain mixtures of different types of wheat grains and other cereals, either integral or otherwise. The importance of such products, particularly when these products are wheat flour tortillas, resides on the fact that said wheat flour tortillas economically compete with the already very popular corn dough tortillas for the preparation of various dishes, either at home, in restaurants and/or in fast food establishments, such as tacos with prepared food, burritos, quesadillas, Arabian bread or tacos, fajitas, buñuelos, chimichangas, etc.

In the present specification, the term "dough" or "masa" refers to the dough manufactured from refined or integral wheat flour, either containing or not other cereals and additives and either integral or refined. Similarly, the term "wheat products" refers to those products manufactured on the basis of refined or integral wheat flour, with or without other grains, cereals or additives. The term "tortillas" means flat and circular food products made from wheat flour dough with or without other grains or additives.

The wheat flour tortillas mainly contain the following ingredients: refined or integral wheat flour, water, edible oil and/or shortening or lard, salt and baking powder. Also, said products may contain additional flavoring agents, conditioners, emulsifiers, edible gums and preservers in order to improve the flavor, nutritional value, shelf life, texture, handling and appearance of the final product.

The current methods of preparation of wheat flour tortillas are well documented in the literature, with some of them being proprietary techniques. For instance, Serna-Saldivar et al, in Serna-Saldivar, S. O., Rooney, L. W., Wanisca, R. D., Cereal Foods World, 1988, Volume 33, Number 10, describes several methods of making wheat flour tortillas, one of them being the traditional manual shaping of the tortillas, which is carried out by the preparation of wheat dough balls with weights which depend on the desired size of the product. Before shaping the tortillas, the dough balls are permitted to rest for a period of time of from about 7 to about 20 minutes at a temperature of approximately 28° C., in order to permit the activation of the baking powder and the conditioning of the gluten complexes in the dough. After the resting of the dough balls, said dough balls are extended manually by means of wooden, plastic and/or metallic rolls, previously coating the rolls with wheat flour in order to prevent the sticking of the dough to the roll and in order to facilitate the manipulation so as to obtain the traditional circular shape. The weight of the wheat flour tortillas varies between 15 and 35 grams and the moisture content in the raw wheat flour tortilla varies between approximately 45 and 55% by weight.

For cooking the tortillas, several methods are employed. The simplest one of said methods is a batch method which uses a comal that is a heated plate made from clay, metal or ceramics. The comal is heated at a temperature of from about 190° C. to about 250° C., depending on the type of the material of the comal, this method requiring that the cooking of the wheat flour tortilla be carried out on both sides of the product. When the tortilla is deposited for the first time on the hot comal, a first capping layer is developed with a thickness of several tenths of a millimeter, on the side which is in thermal contact with the comal. Normally the time for producing this capping layer is of from 15 to 30 seconds, depending on the temperature of the comal and the moisture content of the product. Then the wheat flour tortilla is turned over in order to carry out the cooking on the apposite side, which generally occurs within a period of time of from 15 to 30 seconds, and a second thin capping layer of several tenths of a millimeter is formed, both first and second capping layers having as their principal function to retain the water vapor.

The cooking time of the tortilla is completed when the product is puffed, inasmuch as the puffing of the tortilla is the indicator of a suitable cooking and in a certain way guarantees the necessary quality for the purposes of providing a suitable shelf life and good handling properties to the product.

Once the tortilla is cooked, the moisture content is reduced by 25 to 34% by weight. The productivity of the method depends on the amount of products able to fit on the comal at any given time, and on the thermal conductivity of the dough being cooked.

At the industrial and semi-industrial level, wheat flour tortillas are generally manufactured by using two main shaping methods: 1.—Hot-press and 2.—Die-cut.

In the hot-press method, the dough balls are prepared in special ball forming machines which feed said balls to an automatic hot press to give the tortilla its well-known flat and circular shape, by using in the hot plates of said presses temperatures of the order of between about 190° C. to 220° C., with pressing times of fractions of a second.

While shaping the tortilla by means of this pressing device, both sides of the tortilla entering into thermal contact with the hot plates, develop two thin capping layers of a thickness of tenths of a millimeter, which seal the tortilla to prevent water vapor exhaustion during the further cooking thereof, and the moisture content of the product is decreased in this stage by between 2 and 3% by weight.

In the die-cut method an extruding device is used for the shaping of a sheet of wheat dough having a suitable thickness, which is thereafter conveyed to a cutting system, having stamping disks in order to provide the circular shape characteristic of the wheat flour tortilla. Due to the fact that in the die-cut method the wheat dough contains less moisture, the thus produced tortillas are better fitted for the production of fried products.

The cooking of the tortillas produced by any one of the above described prior art methods, is carried out in a continuous manner by means of special cooking ovens, which are closed ovens containing conveyor belts to carry the tortillas. The ovens may be heated by the use of gas burners, hot air convection currents, electrical resistors, circulating hot air or by a combination of said means. For purposes of carrying out a suitable marketing of the products, the dimensions, weight and moisture content of the tortillas are kept similar to those obtained by the batch methods.

The temperature of the conveyor belts varies depending on the selected heating system, and generally in the commercial-type ovens, the conveyor belts are heated to a temperature of from about 190° C. to 250° C.

Depending on the temperatures selected for the cooking and on the thermal characteristics and dimensions of the dough, the cooking time for the wheat flour tortilla varies between about 60 and about 120 seconds, and the productivity of the industrial systems normally ranges from 2,500 to 30,000 wheat flour tortillas per hour, with a reduction of the moisture content after cooking to approximately 8 to 10% by weight.

Although these methods are satisfactory for producing the two indispensable capping layers of the wheat flour tortilla, the drawbacks that the moisture retention within the final product is deficient and that the capping layers of the wheat flour tortillas thus produced retain the same rough surface of the hot conveyor belts remain.

One other important problem of these prior art methods is the deficient thermal energy transfer from the hot surface to the product, thus resulting in a limited productivity, inasmuch as the low thermal conductivity of the dough and the amount of thermal energy used for carrying out the heating of the conveyor belt, renders this process slow and inefficient. The solutions proposed for increasing the efficiency of production include the installation of tandem feeding systems in order to increase the amount of products passing through the thermal cooking equipment per unit of time; the provision of means to increase the thermal energy transfer from the heating source to the product; or the design of more efficient ovens.

Some workers in the art have explored the use of microwave radiation for cooking the wheat dough with the purpose of solving the problem of direct contact heating from a comal or from a hot conveyor belt for manufacturing wheat flour tortillas. This method, however, excessively dries the shaped pieces of wheat dough, without satisfactorily cooking the outermost parts of the tortilla, thus producing a hard tortilla having inappropriate characteristics, namely, unattractive appearance, brittleness and absence of the characteristic flavor and color. Therefore, high frequency radiation has only been used for drying wheat flour products, but has been considered unsuitable for cooking wheat flour tortillas.

In order to try to solve the above problems, the present invention seeks to overcome the drawbacks shown by the prior art methods by means of the use of a method which permits to cook wheat flour products by using infrared radiation without unduly drying the same.

OBJECTS OF THE INVENTION

Having in mind the defects of the prior art methods, it is an object of the present invention to provide a method for cooking wheat flour tortillas by the use of infrared radiation, which will greatly facilitate the manufacturing and cooking operations.

Another object of the present invention is to provide a method of cooking wheat flour tortillas, which will provide for the continuous manufacture of said products in an efficient and well controlled manner.

One other object of the present invention is to provide a method of cooking wheat flour tortillas by the use of infrared radiation, which will be capable of being carried out in a simple, low cost, practical and functional equipment.

One other and more specific object of the present invention is to provide a method of cooking wheat flour tortillas, which will enable the manufacture of said tortillas in short times and with a quality equal or better to that obtained by the traditional comal or batch cooking method.

Another object of the present invention is to provide a method of cooking wheat flour tortillas, which will accomplish the fast cooking of the wheat flour tortillas without an excessive dehydration thereof.

The foregoing objects and others ancillary thereto are preferably accomplished as follows:

According to a preferred embodiment of the present invention, a method of cooking wheat flour tortillas is provided which comprises the steps of:
a) Preparing a wheat flour based dough;
b) Cutting and shaping the dough into circular flat pieces of predetermined diameter and thickness;
c) Generating infrared radiation waves to be irradiated within a cooking space for the wheat flour tortillas;
d) Selecting an optimal wavelength band of said infrared radiation waves which will produce a maximum absorption of infrared radiation by the wheat flour tortillas to quickly evaporate water from the outermost surfaces thereof in order to form capping layers which will retain moisture within the inner portion of the tortillas; and
e) Passing the uncooked wheat flour tortillas through said cooking space at a predetermined speed in order to produce the desired degree of cooking of the same.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

DETAILED DESCRIPTION

Figure 1:
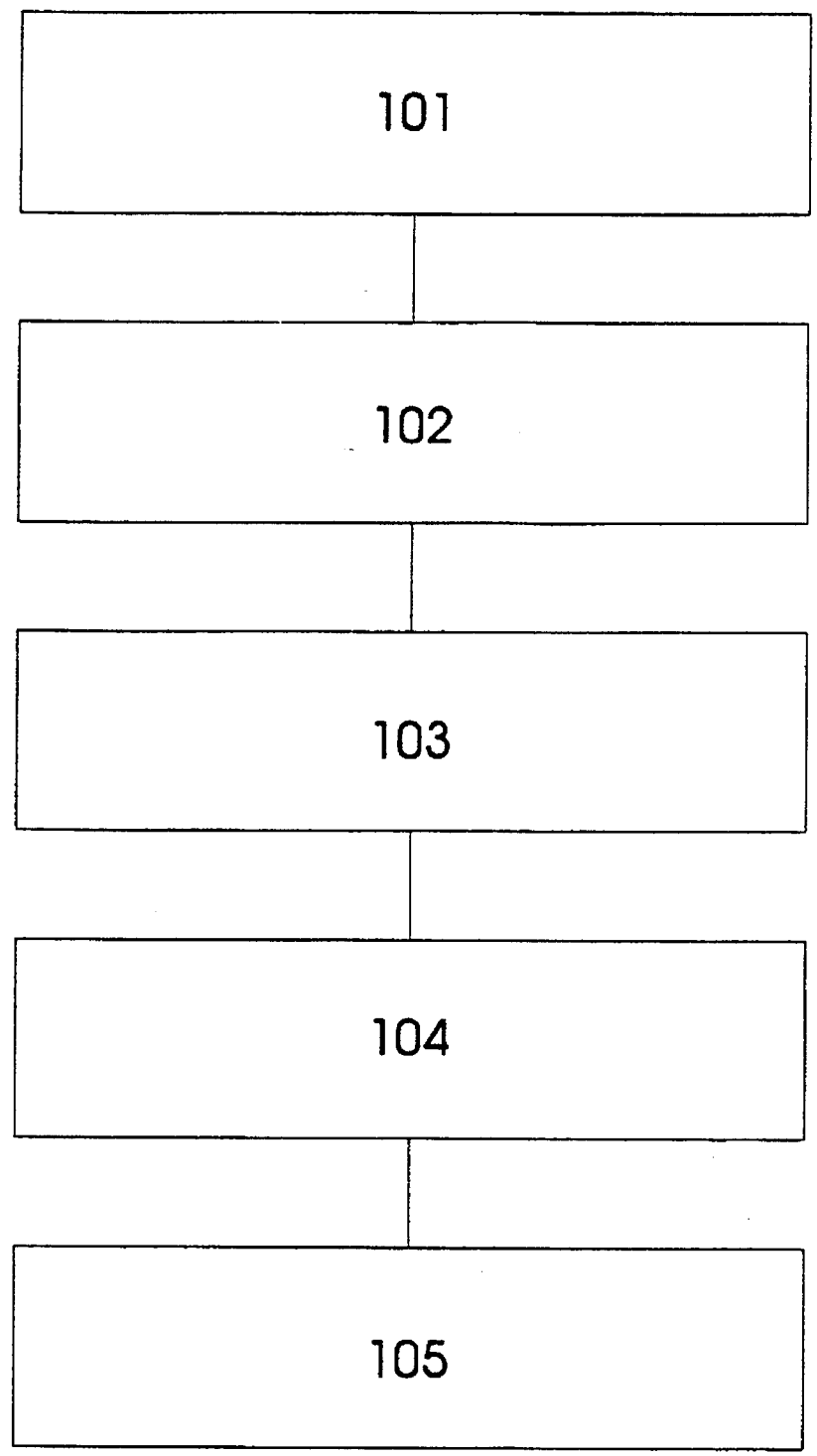
FIG. 1 is a block diagram showing the stages of a method of cooking wheat flour tortillas by using infrared radiation, in accordance with the principles of the present invention.

Having now reference to the accompanying drawings and more particularly to FIG. 1 thereof, there is shown a method of cooking wheat flour tortillas by using infrared radiation in accordance with a specific embodiment of the present invention, which comprises in general terms a first step 101 for preparing a wheat flour dough to be cooked, for which purpose any prior art dough composition and method may be used, with the dough containing all the required additives and/or additional ingredients.

In order to enable the obtention of the handling and appearance characteristics of the final product, the total moisture content of the dough must be controlled at a desired level, which will vary depending on the type of product to be formed. In accordance with the embodiment to be described, for the obtention of wheat flour tortillas the moisture content in the dough must be maintained at a level of from about 30% to 45%, which is a suitable level for an efficient cooking with the use of infrared radiation.

After the preparation of the dough has been completed, a second step 102 is carried out in order to shape the wheat flour tortillas to the desired geometry, which is preferably circular and flat. Preferably the tortillas are circular pieces having a diameter of from about 8 to about 20 cm and a thickness of from about 0.5 to about 5 mm. The method of shaping the tortillas, however, may be any prior art method.

The already shaped tortillas are subjected to the following step 103 which comprises conveying the tortillas towards a cooking chamber, for which purpose the wheat dough tortillas are placed on a continuous conveyor element, preferably an endless conveyor belt for transporting the tortillas towards the interior of the cooking chamber. The conveyor element must be transparent to the infrared radiation and capable of withstanding the cooking temperatures of the wheat flour tortillas.

Before the first tortilla product enters into the cooking chamber, step 104 which consists in the selection of a suitable frequency band of the infrared radiation for use in the cooking chamber, must be carried out. The frequency band in the infrared range which is selected in this step 104, as well as the power level of the infrared radiation which is necessary to obtain the suitable cooking of the tortilla, depends on the type of tortilla to be cooked, in order to suitably form the necessary thin capping layers that cover and seal the outermost faces of the tortilla.

For selecting the frequency band suitable for the cooking operation, it must be reminded that for tortillas based on wheat flour, the optical absorption factor possesses several maxima in the wavelength range investigated. At wavelengths greater than 4 micrometers, there is a sequence of maxima that change in amplitude with temperature, and this dependency may be associated with the evaporation of water molecules in the mixture or to the gelatinization of starch.

Specifically, in the case of raw tortilla prepared from wheat flour dough, it has been found that the preferred emission band for the cooking of this product is between 1.5 and 4 micrometers. This band is adequate for cooking wheat flour tortillas, because although its penetration through the outer surface of the tortillas is only of several micrometers, the position of the maximum in the absorption spectrum is essentially independent from the temperature.

For other doughs of different compositions, different maxima exist in the region of some micrometers, but the important factor to be considered in the cooking of wheat flour tortillas by using infrared radiation, is to find the frequency band in which the absorption factor is independent from temperature, since otherwise the absorption of this radiation into said product is too low, thus rendering the cooking process inefficient.

The power of the infrared radiation emitters is selected in accordance with the weight of the dough, the quantity of moisture to be removed, the desired increase in the temperature and the time selected for cooking the tortilla. With the purpose of determining the power requirements of the infrared radiation for the emitters, it must be assumed that the raw wheat flour tortilla is made out of a preferably heterogeneous mixture of wheat flour material and water. Knowing the content of moisture of the tortilla, it is possible to determine the effective absorption factor of the product by means of effective medium theories which are very well known to those skilled in the art. In particular, for wheat flour tortillas having from 30 to 45% by weight of moisture, the preferred values of the absorption factor in accordance with this invention are of from 30 to 50.

Finally, once the frequency band has been selected, the tortillas that are being introduced into the cooking chamber are subjected to cooking step 105, for which the shaped tortillas are subjected to the previously selected infrared radiation during a period of time of from about 10 to about 30 seconds.

In view of the fact that the cooking method for wheat flour tortillas involves a partial dehydration, sufficient infrared radiation energy must be supplied to the tortilla in order to achieve temperatures in the vicinity of the boiling point of water, in order to permit reducing its moisture content by 8 to 10% by weight. The preferred level of infrared radiation energy for the cooking of wheat flour tortillas, with the use of the principles of the present invention, varies between 2.5 and 7.5 joules per gram of tortilla at a preferred wavelength band with maximum emission between 2 to 4 micrometers, with residence times of from 10 to 30 seconds per each wheat flour tortilla.

In order to obtain a satisfactory cooking, the configuration of the system or optical arrangement in the apparatus to be used in order to carry out the process of the present invention, which will be described hereinafter, must be such that the density of infrared radiation be homogeneous along the surface of the tortilla.

In the initial stages of the cooking of the wheat flour tortillas, it is essential to supply a fast heating of the outermost surfaces to form the above mentioned capping layers so that their inner portion may retain a suitable amount of moisture, for which purpose the infrared radiation must be beamed perpendicularly to both surfaces of the tortilla being cooked, by using an optical arrangement with a special design, combined with a suitable configuration of infrared radiation emitters that will permit the simultaneous fast heating of both faces of the tortilla.

The radiation pattern is controlled by means of metallic optical reflectors and the infrared radiation generator is tuned to an emission band with wavelengths in the region of 1.5 to 4 micrometers and with an infrared radiation energy of from 2.5 to 7.5 joules per gram of the tortilla.

The most important feature of the infrared radiation cooking step is to permit the radiation to cook only the outermost part of both surfaces of the tortilla, thus permitting the formation of two moisture retaining capping layers that avoid the dehydration of the interior portion of the tortilla during the final cooking cycle.

Figure 2:
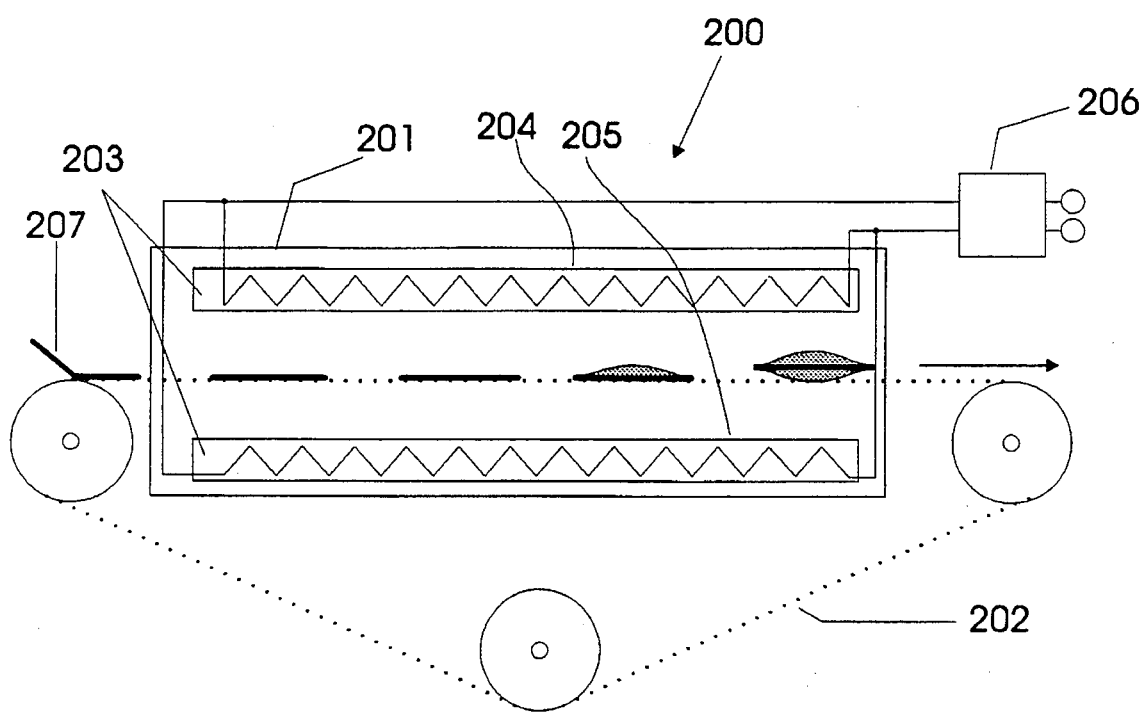
FIG. 2 is a diagrammatic elevational cross-sectional view of an illustrative apparatus to carry out the method of the present invention.

FIG. 2 shows an apparatus 200 for cooking wheat flour tortillas using infrared radiation waves, which comprises a cooking chamber 201, said chamber being thermally isolated and provided with any suitable geometrical shape. The preferred embodiment of chamber 201 is a chamber of rectangular shape, provided with an endless conveyor belt 202 for moving the tortillas to be cooked, longitudinally passing through the inner portion of cooking chamber 201, said endless conveyor belt 202 being actuated by any drive, which may be mechanical, hydraulic, electric, or the like. An infrared radiation emitter and optical system 203 is located within the cooking chamber 201 and comprises at least two infrared radiation emitters 204 and 205, the emitter 204 being located above and along the full length of the endless conveyor belt 202, while the emitter 205 is located below and along the full length of the endless conveyor belt 202, both emitters 204 and 205 including optical reflectors, preferably metallic, which are placed one in front of the other so as to direct the infrared radiation against the outer faces of the tortilla which is passing therebetween, thus permitting to direct the infrared radiation perpendicularly to the outer faces of the tortilla to be cooked. An temperature controller system 206 is interconnected to the emitters 204 and 205 for regulating the emission of infrared radiation.

The optical reflectors of the emitters 204 and 205 are used for concentrating the radiation on the outer faces of the tortillas, whereby in order to obtain a satisfactory cooking, the arrangement of the emitters 204 and 205 including their reflectors must be such that the density of the infrared radiation be homogeneous throughout the surface of the tortilla.

The infrared radiation is generated in the emitters 204 and 205, by means of an arrangement of resistive elements connected to an alternating current line. The infrared radiation emitters 204 and 205 are supported within the chamber 201 by means of a thermally insulating frame which has no relevance to the present invention and is not shown in FIG. 2.

The density of the energy of infrared radiation depends on the number of resistors present in the emitter, and the dimension of the infrared radiation emitters depends on the amount of tortillas to be cooked, as well as on the time used for the cooking cycle.

The basic operation of the apparatus 200 consists in feeding the tortillas 207 made of wheat flour dough, which have been previously shaped by any prior art method, for which purpose the endless conveyor belt 202 transports the wheat flour dough tortillas 207 towards the interior of the cooking chamber 201, such that the tortillas will receive on their two faces the emissions of infrared radiation directed by the optical system 203 and emitted by the infrared radiation emitters 204 and 205. The conveyor belt 202 must be transparent to infrared radiation and capable of withstanding the cooking temperatures of the wheat flour tortillas.

The maximum of infrared radiation emission is regulated by means of the controller system 206 in order to regulate the temperature of emission or radiation.

The present invention will best be understood by reading the description of an embodiment of a method of cooking wheat flour dough tortillas which is given as illustrative but non limitative of the present invention in the following example.

EXAMPLE

Fresh dough was prepared by using a mixture of 500 grams of refined wheat flour, 50% by weight of water, 12% of edible oil and 2% of salt.

The moisture content of the dough prepared was determined by weighing a portion of the dough before and after dehydration to 40° C. for 12 hours. For the manufacture of wheat flour tortillas, balls of dough having weights of between 20 and 25 grams were prepared and thereafter flattened by means of a plastic roller covered with wheat flour until wheat flour tortillas having diameters of from 10 to 12 cm. were shaped.

For the cooking of the wheat flour tortillas, said tortillas were placed on a belt made with a wire mesh manufactured with stainless steel No. 18 wire (18 strands per inch).

Infrared radiation having a wavelength within the range of 2.5 to 4 micrometers was used for obtaining a maximum of energy absorption by the dough.

For the cooking cycle two optical arrangements and infrared radiation emitters were used, one facing the other, each arrangement having four resistive elements having lengths of 60 cm. and diameters of 0.3175 cm. and spaced by a distance of 1 inch. The emitters were manufactured with a Ni-Cr alloy and lined with a tubular sheath of stainless steel, the interior of which was insulated with MgO ceramics, and supported by a polished stainless steel structure, which also actuated as a reflector.

The electrical power supplied to each one of the infrared radiation emitters was of 900 VA. The surface temperature corresponding to each emitter element was of 1000° K., producing a maximum of emission having a wavelength of 2.9 micrometers. This emission was controlled by means of the emission temperature controller system described above. The power irradiated by the emitter elements was of 2 watts/cm2.

The selected emission band for the cooking of the tortillas was of from 2.5 to 3.5 micrometers and the density of the energy required for the cooking of each tortilla was of 5.5 watts/gr. in a period of time of about 20 seconds.

The thus obtained tortillas resulted to be of excellent quality for human consumption, with absolute absence of brittleness and showing a pleasant flavor and color.

It may be seen from the above that the method of the present invention for cooking wheat flour tortillas using infrared radiation, as well as the apparatus for carrying out said method, provide for the optimization and a considerable increase in the efficiency of the manufacture of wheat flour tortillas by means of a continuous industrial method, without altering in any respect the traditional characteristics of consistency and flavor of the tortillas cooked by the old comal method.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. A method of cooking wheat flour tortillas comprising:
   a) preparing a wheat flour based dough;
   b) cutting and shaping the dough into circular flat pieces of predetermined diameter and thickness to form uncooked wheat flour tortillas;
   c) generating infrared radiation waves to be irradiated within a cooking space for the wheat flour tortillas;
   d) selecting an optimal wavelength band of said infrared radiation waves in which the absorption factor is independent from temperature and which will produce a maximum absorption of infrared radiation by the wheat flour tortillas to quickly evaporate water from the outermost surfaces thereof in order to form capping layers which will retain moisture within the inner portion of the tortillas; and
   e) passing the uncooked wheat flour tortillas through said cooking space at a predetermined speed in order to produce the desired degree of cooking of the tortillas.

2. A method of cooking wheat flour tortillas according to claim 1 wherein said wheat flour based dough has an initial moisture content of from about 30 to about 55% by weight.

3. A method of cooking wheat flour tortillas according to claim 1 wherein said optimal wavelength band of infrared radiation waves is selected such that the maximum optical absorption factor for the wheat flour tortillas to be cooked is relatively independent to changes in temperature.

4. A method of cooking according to claim 2 wherein said infrared radiation waves are generated within a wavelength range of from about 1.5 to about 4 micrometers.

5. A method of cooking according to claim 3 wherein the tortillas are cooked under a wavelength band of infrared radiation having a maximum emission factor corresponding to wavelengths of between about 2.5 and 3.5 micrometers.

6. A method of cooking according to claim 1 wherein said infrared radiation waves are generated at an energy level of from about 2.5 to about 7.5 Joules per gram of the uncooked tortilla.

7. A method of cooking wheat flour tortillas comprising:

a) preparing a dough by admixing and kneading a mixture comprising wheat flour, water, an animal or vegetable fat, and salt;

b) cutting and shaping the dough into circular flat pieces of predetermined diameter and thickness to form uncooked wheat flour tortillas;

c resting the dough pieces for a period of time of from about 7 to about 20 minutes at a temperature of about 20° C., until the moisture content of the dough pieces is of from about 30 to about 45% by weight;

d) generating infrared radiation waves to be irradiated within a cooking space for the wheat flour tortillas;

e) selecting an optimal wavelength band of from about 1.5 to about 4 micrometers of said infrared radiation waves to produce a maximum absorption of infrared radiation by the wheat flour tortillas to initially quickly evaporate water from the outermost surfaces thereof in order to form capping layers which will retain moisture within the inner portion of the tortillas; and f) passing the uncooked wheat flour tortillas through said cooking space at a speed sufficient to provide a residence time of from about 10 to about 30 seconds to reduce the moisture content thereof by about 8 to 10% by weight and to produce the desired degree of cooking of the tortillas.

8. A method of cooking wheat flour tortillas according to claim 6 wherein said circular flat pieces of wheat flour dough have a diameter of from about 8 to about 20 cm and a thickness of from about 0.5 to about 5 mm.

9. A method of cooking wheat flour tortillas according to claim 6 wherein said infrared radiation is generated within a wavelength band between 2 to 4 micrometers with an energy level of from about 2.5 to about 7.5 Joules per gram of tortillas.

10. A method of cooking wheat flour tortillas according to claim 2 wherein said wheat flour based dough has an initial moisture content of from about 30 to about 45% by weight.

* * * * *